United States Patent [19]

Hewitt et al.

[11] 4,006,460
[45] Feb. 1, 1977

[54] COMPUTER CONTROLLED SECURITY SYSTEM

[75] Inventors: William D. Hewitt, Owings Mills; Roy S. Diffrient, Reisterstown; Richard A. Bajackson, Cockeysville; Gerard M. Blair, Towson, all of Md.

[73] Assignee: Westinghouse Electric Corporation, Pittsburgh, Pa.

[22] Filed: Dec. 10, 1974

[21] Appl. No.: 531,424

[52] U.S. Cl. .................. 340/149 R; 340/409; 340/276; 340/164 R; 340/163
[51] Int. Cl.$^2$ .................. G08B 23/00; H04Q 9/00
[58] Field of Search ....... 340/147 R, 147 P, 149 R, 340/151, 409, 163, 420, 276, 164 R; 178/DIG. 13

[56] References Cited

UNITED STATES PATENTS

| | | | |
|---|---|---|---|
| 3,551,885 | 12/1970 | Henzel | 340/163 |
| 3,622,994 | 11/1971 | Schoenwitz | 340/163 |
| 3,626,370 | 12/1971 | Stubbs | 340/163 |
| 3,733,430 | 5/1973 | Thompson et al. | 178/DIG. 13 |
| 3,736,561 | 5/1973 | Rumpel | 340/147 P |
| 3,737,858 | 6/1973 | Turner et al. | 340/151 |
| 3,813,650 | 5/1974 | Hunter | 340/172.5 |
| 3,820,074 | 6/1974 | Toman | 340/151 |
| 3,824,550 | 7/1974 | Schoenwitz | 340/151 |
| 3,855,590 | 12/1974 | Neuner | 340/413 |
| 3,895,351 | 7/1975 | Neuner et al. | 340/147 P |

Primary Examiner—Donald J. Yusko
Attorney, Agent, or Firm—M. P. Lynch

[57] ABSTRACT

A bidirectional electronic interface couples remote sensing security transducers such as fire and burglar monitoring devices to a computer such that the circuitry of the bidirectional electronic interface functions to both transmit signals from the remote sensing transducer to the computer for analysis and processing and transmit control and data information to remote control and monitoring stations. The computer scans the content of the bidirectional electronic interface for remote transducer information with the bidirectional electronic interface serving as a storage apparatus. The computer is programmed to respond to the information presented by the bidirectional electronic interface to initiate predetermined control and data recording functions for both direct activation of remote apparatus and for transmittal of control signals through the bidirectional electronic interface circuitry to remote apparatus. The flexibility provided by the bidirectional electronic interface circuitry provides for effective and efficient utilization of conventional computer capability in a security system. Circuitry of the type disclosed herein has been described in detail in U.S. Pat. No. 3,805,234 entitled "Digital Data Transmission Systems" issued Apr. 14, 1974 and U.S. Pat. No. 3,910,322 entitled "A Test Set Controlled By A Remotely Positioned Digital computer," both of which have been assigned to the assignee of the present invention.

4 Claims, 5 Drawing Figures

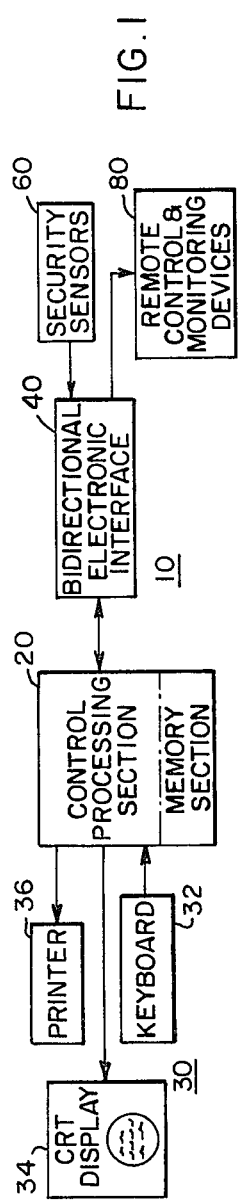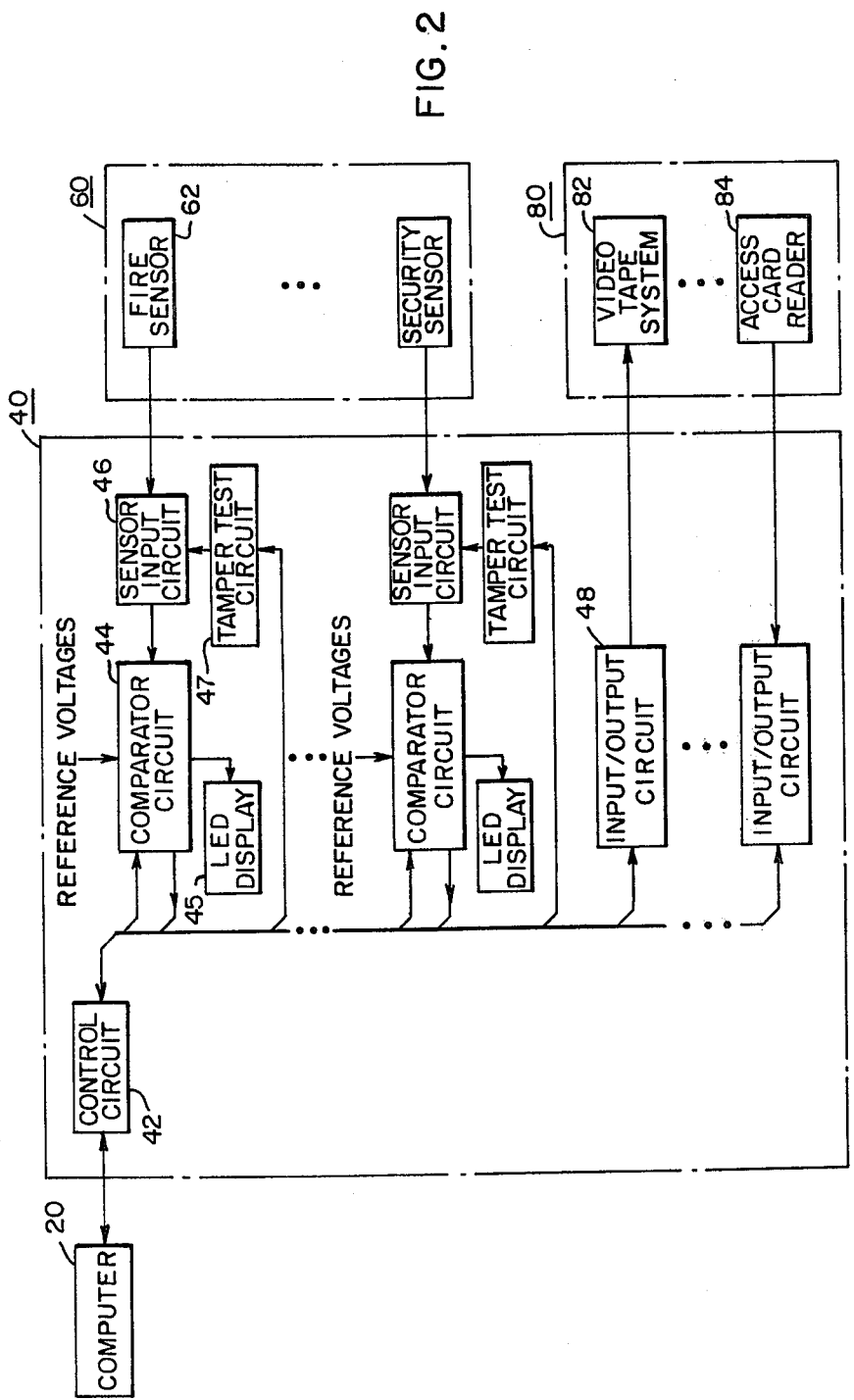

COMPUTER CONTROLLED SECURITY SYSTEM

BACKGROUND OF THE INVENTION

Conventional security systems have not been designed to utilize the flexibility available from state of the art computers. Many of the hard wired systems provide a single function in response to a predetermined input and do not provide for analysis of the input information relative to stored information in order to formulate a tailored response.

In those security systems which do incorporate computers, the computers are under utilized while at the same time representing a critical component in the system without which the total system would be rendered inoperative. In such systems a plurality of input signals are scanned by a peripheral component and digitized in an A/D multiplexer prior to transmission to the computer. The peripheral scanning and digitizing component provides a one-way line of communication from remote transducers to the computer. The computer in turn responds to the input signal information received and communicates directly with data recording apparatus.

SUMMARY OF THE INVENTION

In the security system described hereafter and illustrated in the accompanying drawings, a bidirectional electronic interface circuit provides two-way communication between remote sensing and control components and a central computer. The two-way communication provided by the single bilateral electronic circuit minimizes the complexity of the time and the cost of fabricating a highly versatile security system. In contrast to the conventional security systems employing computers, the bidirectional electronic interface circuit provides storage of the multiple input signals received from remote transducers while the scanning of the stored information is accomplished by the computer. The bidirectional electronic interface further provides operational capability independent of the computer. In the event of a computer breakdown or failure, the bidirectional electronic interface circuit has the capability of maintaining the input information and transmitting the information through backup components to an operator. In the bidirectional electronic interface circuit, a plurality of identical comparator circuits are each separately connected to an input circuit designed to be electronically compatible with a remote sensing transducer. The comparator circuits analyze the input signals relative to predetermined characteristics and store the information resulting therefrom for subsequent access by the computer. Further included in the bidirectional interface circuit are a plurality of input/output circuits providing bilateral communication between remote monitoring and control apparatus and the computer simular to that disclosed in the automatic testing equipment disclosed in the above referenced applications and issued U.S. Patent. A common control circuit operatively connects the comparator circuit and the input/output circuits to the computer. The comparator circuits, in addition to providing information to the computer, provide output signals capable of driving discrete control and indicating circuits independent of the computer operation.

DESCRIPTION OF THE DRAWINGS

The invention will become more readily apparent from the following exemplary description in connection with the accompanying drawings:

FIG. 1 is a basic block diagram illustration of a security system embodying the invention;

FIG. 2 is a more detailed block diagram schematic of the embodiment of FIG. 1;

DESCRIPTION OF THE INVENTION

Figure 3:
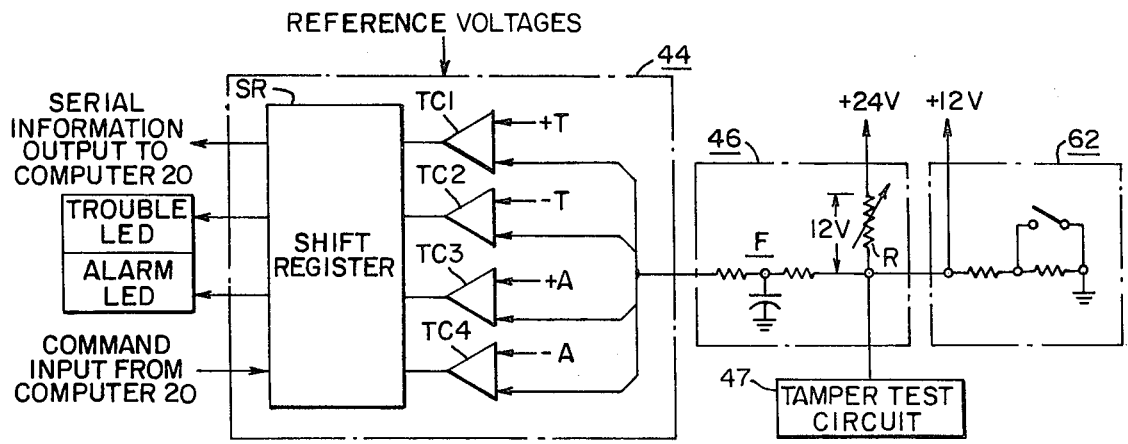
FIG. 3 is an electrical schematic representation of typical remote sensing circuits, input circuits and comparator circuits of the embodiment of FIG. 1.

Referring to FIG. 1 there is illustrated in block diagram a security system 10 including a computer 20 and conventional associated peripheral equipment 30. The computer 20 is coupled to a bidirectional electronic interface circuit 40 which functions to make available to the computer, input information from security sensors 60 while also providing a communications link between the computer 20 and remote control and monitoring devices 80. The computer 20, which can be implemented through the use of any one of several commercially available mini-computers, such as the Data General Nova 2, responds to operator control inputs from keyboard 32 to modify the program of the computer while displaying security information on the cathode ray display 34 and providing a permanent record in the printer 36.

The bidirectional electronic interface circuit 40 is illustrated schematically in block diagram in FIG. 2 with the security sensors 60 typically illustrated as consisting of a fire sensor 62 and a security or intrusion sensor 64 and the remote control and monitoring devices 80 typically illustrated as consisting of a video tape system 82 and an access card reader 84.

The control circuit 42 functions to gate the data words or information developed by the comparator circuits 44 and the input/output circuits 48 to the computer 20 as well as gate the computer originated signals to the input/output circuits 48. Inasmuch as the comparator circuit 44 is identical for each of the information channels associated with the individual remote sensors, discussion will be limited to the information channel connected to the fire sensor 62. Comparator circuit 44 responds to signals developed by the fire sensor 62 which are processed by input circuit 46 to render input information compatible with the comparator circuit 44. The comparator circuit 44 compares the input information developed by the input circuit 44 to predetermined reference voltages to determine the status of the input information transmitted from the fire sensor 62. The comparator circuit 44 develops a digital representation of the status of the input information received from the fire sensor 62 for gating to the control circuit 42 which addresses a location in the computer 20 for receiving the information.

A detailed schematic illustration of a typical security system information input channel corresponding to comparator circuit 44, sensor input circuit 46 and fire sensor 62 as illustrated in FIG. 3.

In addition to providing security input information to the computer 20, the comparator circuit 44 provides an additional output signal suitable for control or display purposes which is independent of the operation of the computer 20. This secondary, or backup, signal generating capability of the comparator 44 permits the security system 10 to provide vital security information in addition to, or in place of, the computer 20 in the event of a computer failure. The additional signal generating capability of the comparator circuit 44 is illustrated as typically driving an LED display 45 which would typically be mounted in a central control console.

In addition to a plurality of comparator circuits associated with individual remote security sensing devices, the bidirectional electronic interface circuit 40 further includes a plurality of input/output circuits 48 which permit two-way communication between the computer 20 and remote control and monitoring devices 80. In the schematic illustration of FIG. 2, there is illustrated two typical modes of operation of the input/output circuit, one illustrating the capability of transmitting control signals from the computer 20 to activate a remote apparatus herein illustrated to be a video tape system 82. A sscond mode of operation of the input-/output circuit 48 is illustrated in FIG. 2 as providing two-way communication between the computer 20 and access card reader 84. In this instance the input/output circuit transmits coded information from an access card reader to the computer 20, the computer 20 in turn analyzes the code information to determine the validity of the information and transmits a control signal back through the input/output circuit 48 to the access card reader. Typically such a system would determine the admission of individuals to a restricted area in accordance with information coded on an admission card.

A circuit suitable for implementing the input/output operation as described above is illustrated in detail in FIG. 4.

Referring to FIG. 3 the comparator circuit 44 consists of a shift register SR, receiving input signals from threshold circuits TC1, TC2, TC3, and TC4. The threshold circuits function to compare the input signal developed by the security sensor 62 and processed by the input circuit 46 to predetermined thresholds as illustrated in FIG. 5 corresponding to the status of the security system 10.

Figure 5:
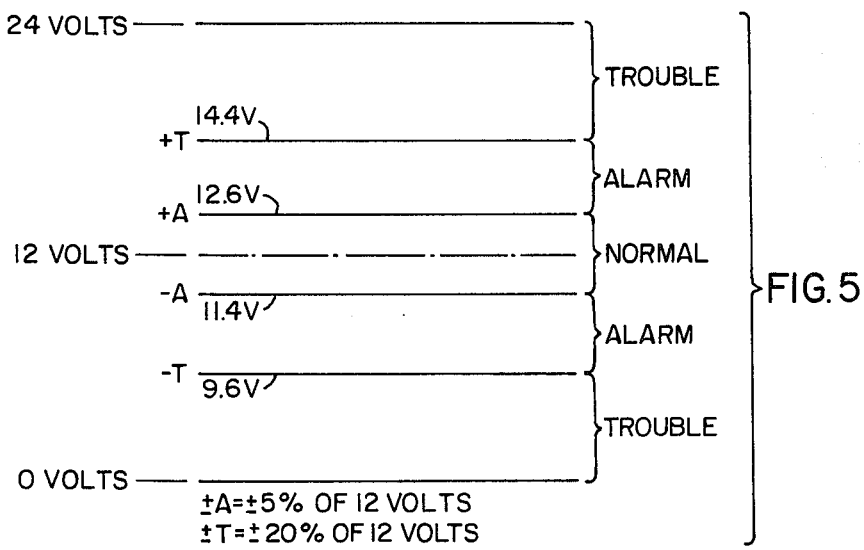
FIG. 5 is an illustration of a typical set of operating parameters suitable for the security system of FIG. 1.

Referring to FIG. 5 assuming the security system is a 24 volt system wherein 12 volts is the normal or mean operating voltage level with a variation of ± 0.6 volts defining a voltage band defining the normal mode of operation. A voltage level of +12.6 identified in FIG. 5 as +A and +11.4 volts identified as −A represents the threshold levels beyond which an alarm condition exists. The alarm voltage range is identified as extending to a voltage level of +14.8 volts identified as +T and +9.6 volts identified as −T. The additional voltage range of +0 to +9.6 and +14.4 to +24 volts is identified as a trouble voltage range. Thus the threshold circuit TC1 compares an input signal developed by the security sensor 62 to a trouble voltage threshold of +14.4 volts and in the event the input signal exceeds the +14.4 volts threshold level the threshold circuit TC1 transmits a signal to the shift register SR. Similarly threshold circuits TC2, TC3 and TC4 respond to input signals exceeding the threshold limits of +9.6, +12.6 and +11.4 respectively by transmitting output signals to shift register SR. The information stored in shift register SR of the comparator circuit 44 is available for transmission to the computer 20 in response to a command input signal from the computer 20 as well as being available for activating an LED control panel display to visually indicate either a trouble or an alarm condition.

The security sensor 62 is typically illustrated as consisting of an impendance network wherein a switch or set of electrical contacts responds, to a change in temperature in the case of a fire sensor, or the actuation of an intrusion device in the case of an intruder, to short a portion of the impedance network thus causing a change in the voltage level output of the security sensor 62. The sensor input circuit 46 provides attenuating capabilities to render the security sensor circuit 62 compatible with the comparator circuit 44 and is illustrated as including a filter network F. In addition to the signal attenuating capabilities provided by the resistor R of the sensor input circuit 46, the sensor input circuit 46 responds to a tamper test signals from circuit 47 to introduce a simulated alarm or trouble condition to evaluate the integrity of the security system 10.

The comparator circuit 44 and the input circuit 46 represent basic circuits which can be duplicated numerous times on a single printed circuit board in order to accommodate a plurality of input signals from remote security sensors 60. The utilization of identical circuits to implement the comparator circuit 44 permits the use of large scale integration techniques.

The same economy in space and cost is achieved through the duplication of the input/output circuit 48 in numbers suitable for accommodating a plurality of remote control and monitoring devices 80.

Figure 4:
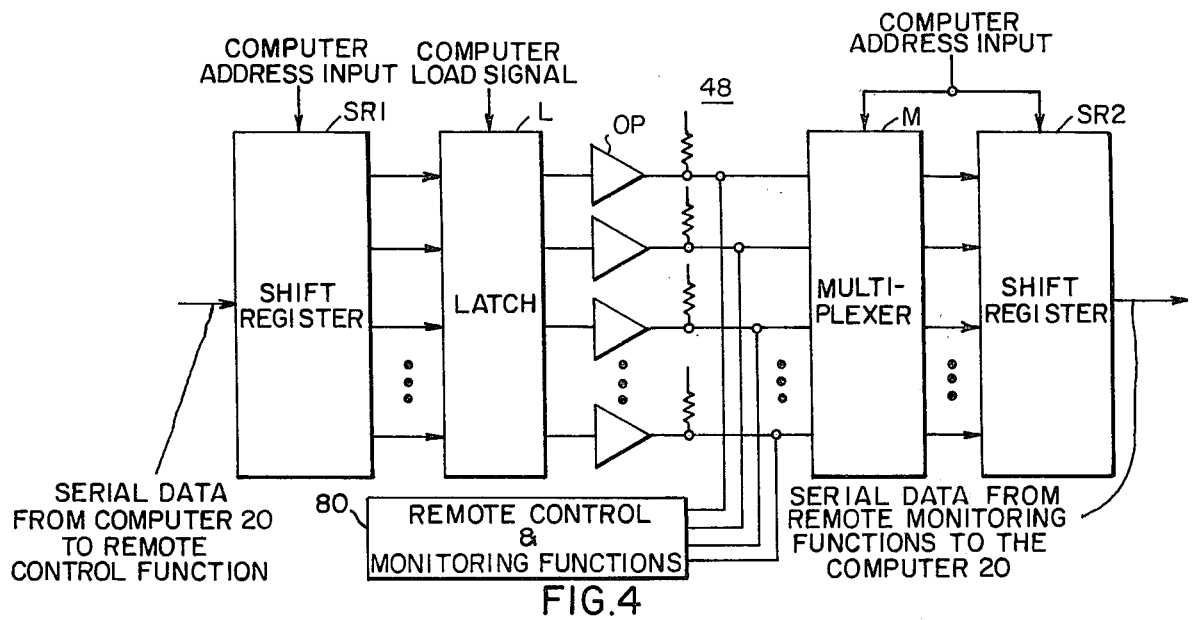
FIG. 4 is an electrical schematic illustration of the input/output circuit of the embodiment of FIG. 1.

A typical implementation of the input/output circuit 48 is illustrated schematically in FIG. 4. The input/output circuit 48 provides either one-way or two-way communication between the computer 20 and the remote control and monitoring devices 80. The same identical circuit can be fabricated and incorporated through large scale integration techniques to satisfy both the one-way communication as required for communication between the computer 20 and the video tape system 82 in order to permit automatic actuation of the video tape system 82 by the computer 20 in response to input information received from remote apparatus. The operation of the access card reader 84 requires two-way communication capability in the input/output circuit 48 in order to permit transmission of card reader input information to the computer 20 and computer communication with the access card reader 84. Communication from the computer 20 to the remote control and monitoring devices 80 is achieved through the use of a shift register SR1 which responds to a computer address input signal by serially introducing to the shift register SR1 the command control signal from the computer 20. In response to a load signal from the computer 20, the information stored in the shift register SR1 is transferred to the latch circuit L which in turn develops an output pulse pattern through a plurality of operational amplifiers OP to develop the control signal for actuating the remote control device 80.

The communication of input information from remote monitoring devices such as the access card reader 84 is achieved through use of a multiplexing circuit M which accepts the pattern of input information developed by the remote monitoring device in response to a command signal from the computer 20. The multiplexing circuit M in turn transfers the input information pattern to the shift register SR2 in response to a command signal from the computer 20. The input information stored in the shift register SR2 is subsequently transmitted in serial form to the computer 20 in response to a computer address input signal to the shift register SR2. The combination of a plurality of input-/output circuits of the type illustrated in FIG. 4 on a single printed circuit board through the use of large scale integration techniques in order to provide a plurality of channels of communication between the computer and remote apparatus is a technique previously used in automatic test equipment for determining the voltage and current levels at a plurality of points in an electrical system.

The combination of the techniques utilized in automatic test equipment as described in the above referenced U.S. Patent and applications in combination with the comparator circuit 44 and input circuit 46 to form the bidirectional electronic circuit 40 represents the adaptation of prior circuit techniques in combination with unique security system circuitry to benefit from the flexibility of conventional computers.

We claim:

1. In a system including one or more computers adapted to receive and process input signals and generate output signals in accordance with programmed information, the combination of,
    a plurality of alarm sensors capable of producing alarm output signals in response to alarm conditions and trouble output signals in response to circuit trouble or tamper conditions,
    an electronic circuit means connected between said alarm sensors and a computer, said electronic circuit means including a comparator circuit associated with each of said alarm sensors for comparing the output signals from the alarm sensor to a first threshold indicative of an alarm condition and a second threshold indicative of a trouble or tamper condition and developing output signals indicative thereof, said electronic circuit means storing the output signals produced by said comparator circuits,
    control circuit means coupling said electronic circuit means to said computer to gate said output signals of said comparator circuits to said computer as requested by the computer, and
    tamper test circuit means operatively connected between said computer and said alarm sensors for applying a tamper test signal from said computer to said alarm sensors to monitor the operational integrity of the alarm sensor circuits as a function of the output signal developed by the comparator circuit as a result of the comparison of the output signal developed by the alarm sensor to said second threshold.

2. In a system as claimed in claim 1 wherein said comparator circuits are identical, and signal conditioning circuits coupling each of said alarm sensors to the associated comparator circuit, each of said signal conditioning circuits adjusting the characteristics of the output signals produced by the respective alarm sensors to render the output signals compatible with the comparator circuits.

3. In a security system as claimed in claim 1 further including display means connected to said electronic circuit means to display said signals of said second outputs.

4. In a system as claimed in claim 1 further including a plurality of signal producing/signal receiving circuits, and
    an electronic circuit means coupling each of said signal producing/signal receiving circuits through said control circuit means to said computer for storing first signals transmitted by said computer through said control circuit means for said signal producing/signal receiving circuits, and storing second signals transmitted by said signal producing/signal receiving circuits for transfer to said computer by said control circuit means at the request of said computer.

* * * * *